United States Patent [19]
Van Doeselaar et al.

[11] Patent Number: 5,717,576
[45] Date of Patent: Feb. 10, 1998

[54] DEVICE AND METHOD FOR PROTECTING ELECTRONIC UNITS IN A SATELLITE FROM ELECTRICAL DISTURBANCE

[75] Inventors: Scott A. Van Doeselaar, El Segundo; Christopher J. Cooper, Lakewood; J. Michael Bodeau, Yorba Linda, all of Calif.

[73] Assignee: Hughes Electronics, Los Angeles, Calif.

[21] Appl. No.: 577,438

[22] Filed: Dec. 22, 1995

[51] Int. Cl.⁶ ........................................ H05K 9/00
[52] U.S. Cl. ................ 361/816; 174/10; 174/24; 361/814; 361/818
[58] Field of Search ............... 361/728, 729, 361/733, 730, 796, 800, 803, 814, 816, 818, 784, 792, 793, 794, 795; 174/35 GC, 35 R, 35 MS; 33/12, 24 R

[56] References Cited

U.S. PATENT DOCUMENTS

| | | | |
|---|---|---|---|
| 5,223,806 | 6/1993 | Curtis et al. | 333/12 |
| 5,386,345 | 1/1995 | Matsuzaki et al. | 361/816 |

*Primary Examiner*—Leo P. Picard
*Assistant Examiner*—Anthony Dinkins
*Attorney, Agent, or Firm*—Terje Gudmestad; Wanda K. Denson-Low

[57] ABSTRACT

Device and method of protecting a satellite from undesired electrical disturbances without significantly increasing the satellite's weight. The device includes two faraday cage structures around the electronic units of the satellite. The two structures are electrically connected via shielded wires to create one continuous faraday cage. Signals from components located outside the faraday cage to the electronic units are made through filter assemblies. The filter assemblies electronically filter undesired signals before routing desired signals to their destination.

13 Claims, 3 Drawing Sheets

DEVICE AND METHOD FOR PROTECTING ELECTRONIC UNITS IN A SATELLITE FROM ELECTRICAL DISTURBANCE

BACKGROUND OF THE INVENTION

A satellite is a type of spacecraft that orbits either the earth or another body of the solar system. There are two main classes of satellites: information satellites and communications satellites. Information satellites transmit signals related to atmospheric and meteorological data, infrared, ultraviolet, gamma and X-ray studies of celestial objects, and surveys of the earth's shape, surface, and resources. Communications satellites receive radio frequency signals from earth by means of highly directional aerials and return them to another earth location for purposes such as long-distance telephony and TV broadcasting.

A satellite typically includes a payload module and a platform module. For a communications satellite, the payload is the communications equipment necessary to perform the mission. The platform typically includes the following subsystems: (1) power; (2) attitude and control; (3) propulsion; (4) on-board telemetry tracking and command (TTC); (5) thermal control; and (6) structure. These subsystems play a vital role throughout the satellite's operational life.

The structure of the satellite platform module includes a configuration of rigid panels capable of withstanding intense mechanical stresses imposed during various phases of the mission. The panels are typically manufactured from strong lightweight materials such as aluminum honeycomb combined with aluminum or carbon fiber face sheets. Panel weight is further minimized by providing holes through the solid material.

An electrical shield called a faraday cage is commonly used to protect the platform electronic units (e.g. power distribution unit and power controller unit) from unwanted electrical disturbances such as electrostatic discharge. Previous satellites have been built with the electronic units and propulsion components (e.g. propulsion tanks and thrusters) dispersed throughout the platform. In order to protect the electronic units, the faraday cage must surround the entire platform. One method of accomplishing this is to wrap the platform in thermal blankets containing layers of metallized material. The blankets are then connected together by blanket ground wires to form a faraday cage around the platform. An alternative approach is to incorporate within the platform panels a material such that, when the panels are connected, a faraday cage is created.

The previous methods suffer from drawbacks. In the first method, numerous wires are required to completely connect the blankets together. The wire connections, which are often missed, cause penetrations in the faraday cage. In the second method, the solid panels add weight and increase satellite cost. In both methods, multiple penetrations of the faraday cage are required in order to make the necessary connections from propulsion components located outside the platform to propulsion components located inside the platform.

Accordingly, there exists a need for a device that provides adequate shielding for the electronic components of a satellite while minimizing satellite weight.

SUMMARY OF THE INVENTION

The present invention provides a device and method which can be implemented in the structure subsystem of a satellite. Specifically, the device and method of the present invention are capable of protecting a satellite from unwanted electrical disturbance without increasing the satellite's weight.

According to a preferred embodiment of the present, the electronic units and propulsion components are separated. Further, the electronic units are grouped closely together to minimize the size of the structure needed to house them. Preferably, there are two sets of electronics units located on the satellite. The structure that houses the electronic units is preferably made from solid panels containing a sufficient amount of aluminum to create a faraday cage around the units. The faraday cage protects the units from electrical disturbances such as the electrostatic discharge formed on the satellite during its mission.

The device and method of the present invention provides several advantages to the structural design of a satellite. The modular placement of electronic units and propulsion components separates critical electronics from propulsion components, thereby allowing a structure with solid panels to house the electronic components without significantly increasing the satellite's weight. The modular placement also allows the faraday cage to be broken into discrete structures connected via a cluster of wires called a harness. Because the propulsion components are located outside the faraday cage, and the electronic units are centrally located, the number of wire connections that penetrate the cage are minimized. Thus a faraday cage constructed according to the present invention is penetrated only where the harness penetrates the two structures. In a first preferred embodiment, the harness is covered by a braided metal in the form of a tubular mesh that wraps 360 degrees around the harness and connects to the two structures via connectors. In a second preferred embodiment, two harnesses are used and are covered by a shielded cable tray made from an aluminum material to provide additional protection from unwanted electrical disturbances.

In another aspect of the invention, modular placement of electronic units allows a novel method of shielding the wires that connect the electronics units to components located outside of the faraday cage. In the presently preferred embodiment, wires from the electronics units are connected to a first side of a filter assembly which is located on a panel of the electronic unit housing. Wires connected to the second side of the filter assembly are routed to the components located outside the faraday cage. The filter assembly electronically filters undesired signals originating from components outside the faraday cage before routing the desired signals to electronics components inside the faraday cage. The new technique alleviates the problems caused by previous methods of individually wrapping and grounding each wire connecting the electronics units to components outside the faraday cage.

The invention itself, together with further objects and attendant advantages, will be understood by reference to the following detailed description, taken in conjunction with the accompanying drawings.

DETAILED DESCRIPTION OF THE DRAWINGS

Figure 1:
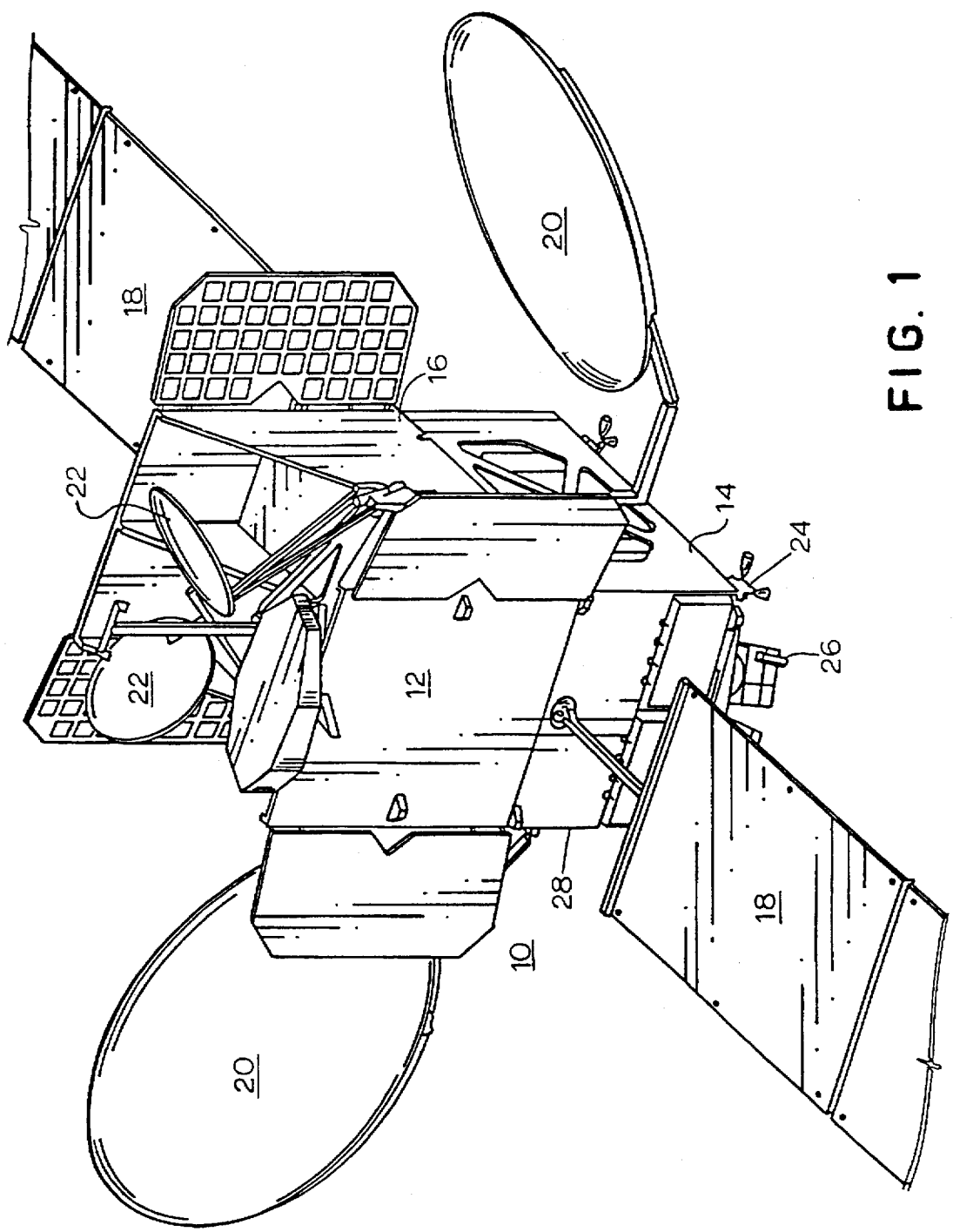
FIG. 1 is a diagram of a satellite capable of utilizing the present invention.

A spacecraft or satellite 10 capable of utilizing the present invention is shown in FIG. 1. The satellite 10 has a spacecraft body 12 which includes a lower bus module or platform 14 and an upper payload module 16. Attached to the aft end of the lower bus module 14 are a plurality of engines. These engines include a centrally positioned liquid orbital thruster (not shown), four chemical propulsion engines 24 located at the corners of the bus module 14 and two pairs of xenon ion propulsion engines 26 (one pair shown). Lower bus module 14 contains fuel tanks (not shown) and various power and control modules that operate the engines and power the payload module 16. Bus module 14 further includes a pair of solar panels 18 that convert sunlight into electricity. The electricity is sent to batteries (not shown) located on the bus module 14. Bus module 14 also has a pair of antennae 20, which receive signals from an earth ground station. The antennae 20 reflect the received signals into reflectors 22, which in turn, reflect the signals into receivers (not shown). The antennae 20 are used to control the satellite 10 and to send signals to the ground station.

Payload module 16 is attached to the bus module 14 and contains a variety of electronic equipment which may contain a number of sensors (not shown). The electronic equipment processes information gathered by the sensors and sends the processed information back to the ground station via antennae 20. The gathered information may concern for example, communications, weather observation, and navigational information.

Figure 2A:
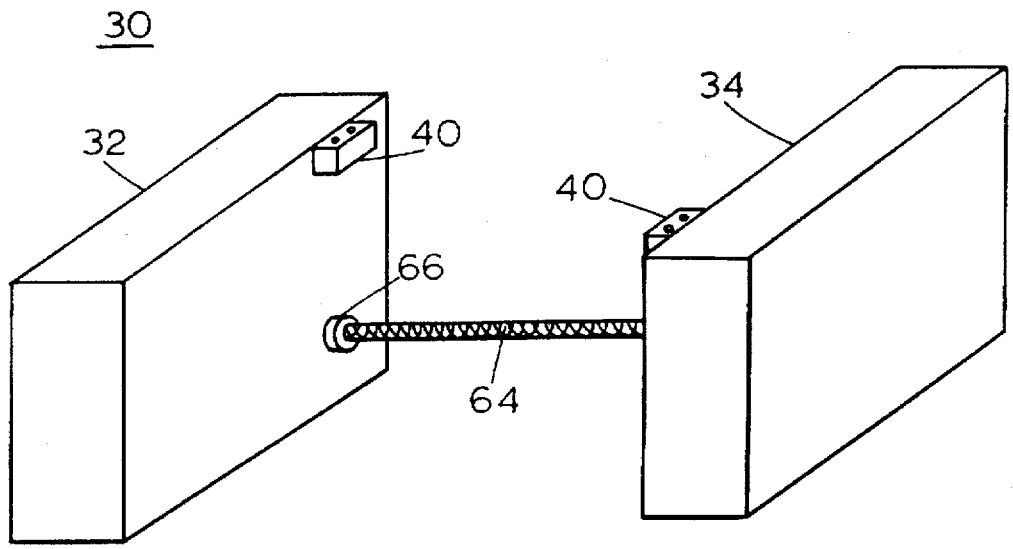
FIG. 2a illustrates a first preferred embodiment for providing faraday cage protection to the electronics units of the satellite of FIG. 1.

FIG. 2a illustrates a first preferred embodiment of the Faraday cage configuration 30 of the present invention. The configuration 30 preferably includes two shielded faraday structures 32, 34 which are located on the north panel 28 and south panel (not shown) of the bus module 14 of FIG. 1. The shielded faraday structures 32, 34 house the electronic units on board the satellite.

The panels of the structures 32, 34 are constructed of a honeycomb core adhesively affixed between two solid aluminum face sheets. In the presently preferred embodiment, the cell size of the core is 3/16 of an inch, the thickness of the core is 3/4 to 1 inch, and the thickness of the aluminum face sheets is 10 to 20 mils. The panels are connected to form a faraday cage around the electronic units using known RF sealing materials. The exact dimensions of the structures 32, 34 should be chosen according to the particular application.

In the present example, the structures 32, 34 are rectangular boxes. The faraday cages of the boxes 32, 34 are electrically connected via a bundle of wires or a harness (not shown) surrounded by a braided metal mesh 64. The braided metal mesh 64 is connected to the boxes 32, 34 via connectors 66 (only one shown) commonly known in the art. A suitable metal mesh 64 is mil-std space qualified commonly known in the art.

Figure 2B:
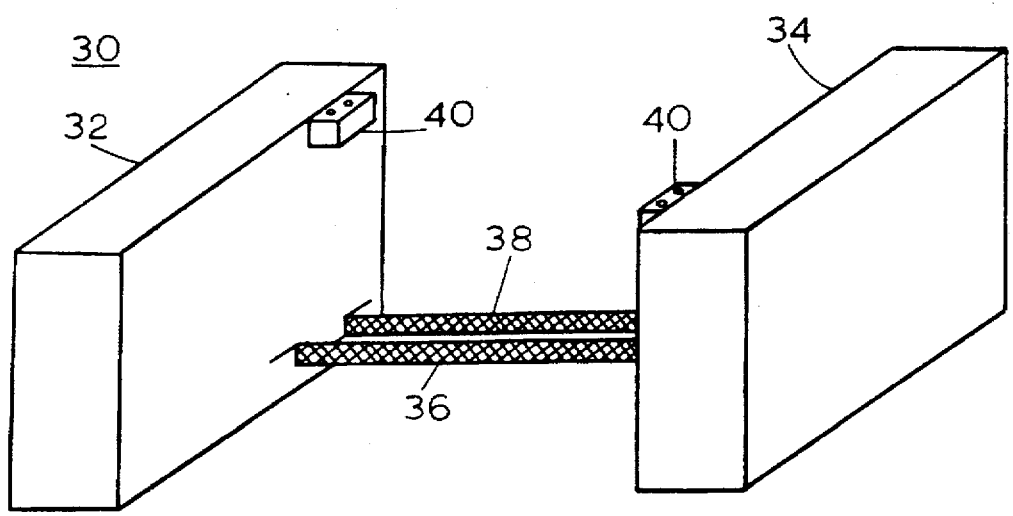
FIG. 2b illustrates a second preferred embodiment for providing faraday cage protection to the electronics units of the satellite of FIG. 1.

In a second preferred embodiment shown in FIG. 2b, the faraday cages of the boxes 32, 34 are electrically connected via two bundles of wires or harnesses (not shown) surrounded by shielded cable trays 36, 38. The bundles of wires are preferably 1 inch thick. Suitable wires are mil-std space hardware wires commonly known in the art. The shielded cable trays 36, 38 preferably comprise two rectangular sheets of aluminum 15 to 20 mils thick. The two rectangular sheets surround the harness and are held together by screws (not shown). The shielded cable trays 36, 38 provide continuity of the faraday cage of structures 32, 34.

Connections between electronics units and units located outside the faraday cage are made through filter assemblies 40. FIG. 3a illustrates a perspective view of a filter assembly 40 which includes a box structure 46, an aluminum lid 42, and an RF gasket 44 commonly used in the art to ensure electrical conductivity. The box structure 46 includes two flanges 48 for mounting the assembly 40 to a panel of the faraday cage structure 32, 34. The panels of the box structure 46 are preferably made from aluminum. One panel 50 of the assembly 40 is configured to accept 66 pin circular input connectors 52 (FIG. 3b). Another panel (not shown) of the assembly 40 is configured to accept 66 pin circular output connectors 54 (FIG. 3b). The connectors 52, 54 are off-the-shelf devices commonly known in the art.

Figure 3C:
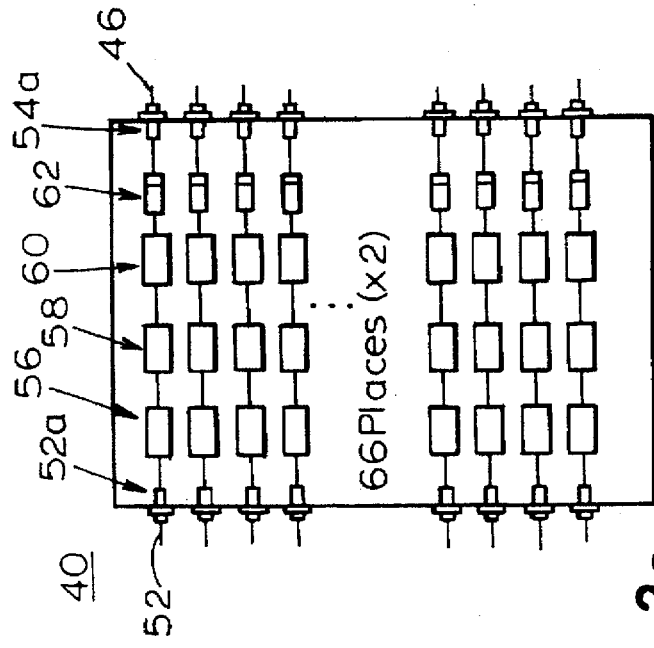
FIG. 3 illustrates several views of a filter assembly that can be used in the faraday cage protection scheme of FIG. 2.
Figure 3B:
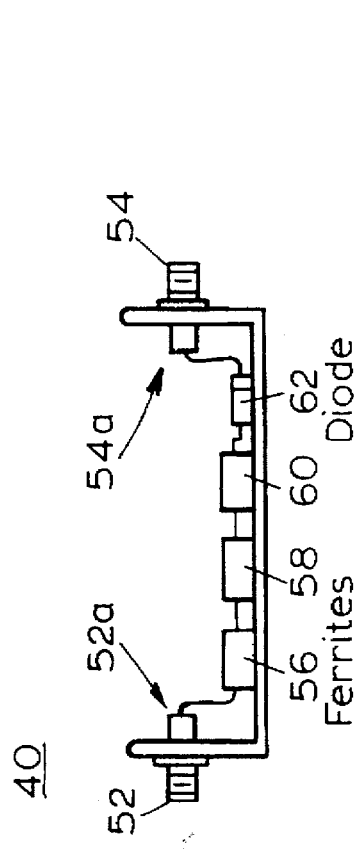
Figure 3A:
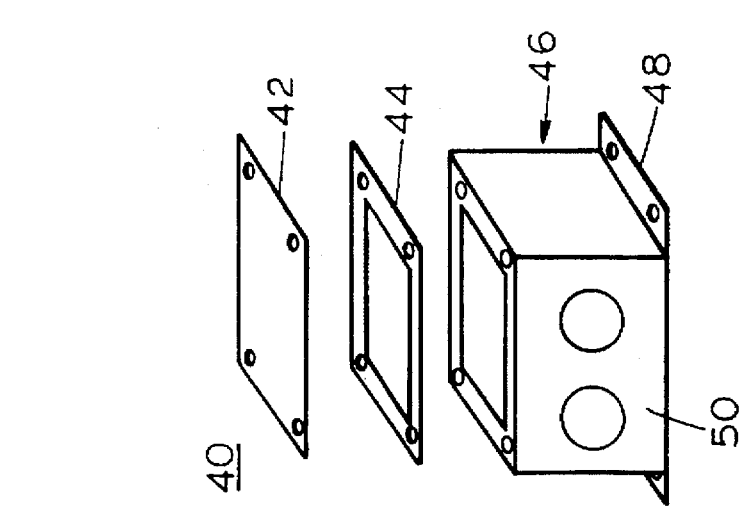

FIGS. 3b and 3c illustrate further details of the filter assembly 40. Inside the filter assembly box structure 46, the wire end of the input connector 52, which is represented by filter pin 52a, is coupled to a first end of a ferrite 56. The other end of the ferrite 56 is connected to the first end of a ferrite 58. The second end of the ferrite 58 is coupled to the first end of a ferrite 60. The second end of the ferrite 60 is coupled to the first end of a diode 62. The second end of the diode 62 is coupled to the wire end 54a of the output connector 54. The ferrites 56, 58, 60 and diode 62 are chosen according to mil-std specifications and should be approved for space applications. The particular size of ferrites and diode should be chosen according to the type and size of signals that are to be filtered.

The components located outside the faraday cage structures 32, 34 are coupled to the pin ends of the 66 pin circular input connectors 52. The electronic units located inside the faraday cage structures 32, 34 are coupled to the pin ends of the 66 pin circular output connectors 54. Signals originating from components outside the faraday cage are electronically filtered through the ferrites 56, 58, 60 and diode 62 before reaching the electronic units inside the faraday cage structures 32, 34.

The device and method of the present invention provide several advantages to the structural design of a satellite. Modular placement of units and propulsion components allows a structure with solid panels to be used to house the electronic units without significantly increasing the satellite's weight. Modular placement minimizes penetrations of the faraday cage, thereby eliminating damage to the electronic units. Modular placement also significantly decreases the probability of digital electronics equipment randomly changing states due to electrical disturbances. Connections between electronic units and components outside the faraday cage through filter assemblies eliminate the problems associated with individual connections such as bad wraps, bad grounds and forgotten grounds.

It should be understood that a wide range of changes and modifications can be made to the preferred embodiment described above. For example, although rectangular faraday boxes are illustrated, the invention can be implemented using various configurations. It is therefore intended that the foregoing detailed description be regarded as illustrative rather than limiting and that it be understood that it is the following claims, including all equivalents, which are intended to define the scope of this invention.

What is claimed is:

1. A device for electrically isolating electronic components within a satellite from electrical disturbance, said electronic components located on a platform module of said satellite, said platform module including propulsion components and said electronic components, the device comprising:

a first structure forming a first faraday cage;

said electronic components of said platform module comprising a plurality of first electronic components isolated from said propulsion components and contained within said first structure such that said first structure houses said first electronic components and not said propulsion components, and said first structure electrically isolates said first electronic components.

2. The device of claim 1 further comprising:

a second structure forming a second faraday cage;

said electronic components of said platform module further comprising a plurality of second electronic components isolated from said propulsion components and contained within said second structure such that said second structure houses said second electronic components and not said propulsion components, and said second structure electrically isolates said second electronic components.

3. The device of claim 2 further comprising a plurality of wires connecting a predetermined number of said first electronic components to a predetermined number of said second electronic components.

4. The device of claim 1 further comprising a plurality of wires penetrating said first structure and coupled to said first electronic components, said plurality of wires being covered by a shielded cable tray.

5. The device of claim 1 further comprising a filter assembly.

6. The device of claim 5 wherein said filter assembly comprises:

a plurality of ferrites connected in a serial manner; and a diode serially connected to said plurality of ferrites.

7. The device of claim 6 wherein said filter assembly further comprises:

an aluminum box structure comprising a plurality of panels; and connectors mounted on panels of said structure whereby said ferrites and said diode are connected between said connectors.

8. A method of electrically isolating electronic components within a satellite from electrical disturbance, said electronic components located on a platform module of said satellite, said platform module including propulsion components and said electronic components, the method comprising the steps of:

separating said electronic components from said propulsion components, said electronic components comprising a plurality of first electronic components;

forming a first structure that creates a first faraday cage;

housing said plurality of first electronic components and not said propulsion components within said first structure such that said first structure electrically isolates said first electronic components.

9. The method of claim 8 further comprising connecting a predetermined number of said plurality of first electronic components to a predetermined number of components located outside said structures.

10. The method of claim 9 wherein the step of connecting comprises:

connecting a plurality of ferrites in a serial manner wherein said plurality has a first end and a second end, the first end of said plurality connected to a wire side of an input connector;

connecting a diode between said second end of said plurality of ferrites and a wire side of an output connector;

connecting said predetermined number of components located outside said structures to a pin side of said input connector; and connecting said predetermined number of said plurality of electronic components to a pin side of said output connector.

11. The method of claim 8 further comprising the steps of:

forming a second structure that creates a second faraday cage;

housing a plurality of second electronic components within said second structure, said electronic components comprising said plurality of second electronic components which are also separated from said propulsion components, said second structure electrically isolating said second electronic components; and connecting a predetermined number of said first electronic components to a predetermined number of said second electronic components.

12. The method of claim 11 wherein the step of connecting is performed by a plurality of wires.

13. The method of claim 11 wherein said wires are shielded.

\* \* \* \* \*